(12) United States Patent
Brissette et al.

(10) Patent No.: US 10,637,687 B2
(45) Date of Patent: Apr. 28, 2020

(54) EVPN IMPLICIT ALIASING (71) Applicant: Cisco Technology, Inc., San Jose, CA (US)

(72) Inventors: Patrice Brissette, Gatineau (CA); Luc André Burdet, Gatineau (CA); Samir Thoria, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 193 days.

(21) Appl. No.: 15/492,593

(22) Filed: Apr. 20, 2017

(65) Prior Publication Data

US 2018/0309596 A1 Oct. 25, 2018

(51) Int. Cl.
*H04L 12/46* (2006.01)
*H04L 12/723* (2013.01)

(52) U.S. Cl.
CPC .............. *H04L 12/4679* (2013.01)

(58) Field of Classification Search
CPC ... H04L 12/4641; H04L 45/02; H04L 45/741; H04L 61/103; H04L 61/6022; H04L 45/54; H04L 45/021; H04L 45/64; H04L 45/66; H04L 45/68; H04L 45/50; H04L 12/4604

See application file for complete search history.

(56) References Cited

U.S. PATENT DOCUMENTS

2017/0373973 A1* 12/2017 Bickhart ............ H04L 12/4641
2018/0077050 A1* 3/2018 Tiruveedhula ...... H04L 12/4641

OTHER PUBLICATIONS

Sajassi, Ed., A., et al., "BGP MPLS-Based Ethernet VPN," Standards Track document, Internet Engineering Task Force (IETF), Feb. 2015 (retrieved on Oct. 13, 2016 fromhttDs://tools.ietf.ora/htmt'ifc7432), 57 pages (Year: 2016).*
Sajassi, Ed., A., et al., "BGP MPLS-Based Ethernet VPN," Standards Track document, Internet Engineering Task Force (IETF), Feb. 2015 (retrieved on Oct. 13, 2016 from https://tools.ietf.org/html/rfc7432), 57 pages.

* cited by examiner

*Primary Examiner* — Romani Ohri
(74) *Attorney, Agent, or Firm* — Meunier Carlin & Curfman LLC (57) ABSTRACT

Presented herein is an exemplified system and method that implicit aliasing in an EVPN network having provider edge nodes in a network infrastructure (e.g., a MPLS infrastructure). In particular, the exemplified system and method employ a Border Gateway Protocol (BGP) based EVPN construct that facilitates multiplexing across large number of different physical interfaces, among multiple device manufacturers and vendors, while providing implicit antialiasing functionality, and being fully supportive of EVPN capabilities. In an embodiment, a method is disclosed that joins the reachability information from a first network device and a second network device, in response to receiving a first EVPN advertisement from the first network device and receiving a second EVPN advertisement from the second network device, such that traffic later transmitted in associated with the first EVI or the first ESI are routable to both the first network device and the second network device.

20 Claims, 8 Drawing Sheets

ETHERNET AUTO-DISCOVERY ROUTE

| |
|---|
| ROUTE DISTINGUISHER (RD) (8 OCTETS)    *502* |
| ETHERNET SEGMENT IDENTIFIER (10 OCTETS)    *504* |
| ETHERNET TAG ID (4 OCTETS)    *506* |
| MPLS LABEL (3 OCTETS)    *508* |

*FIG. 5*

MAC/IP ADVERTISEMENT ROUTE

| |
|---|
| ROUTE DISTINGUISHER (RD) (8 OCTETS)   *502* |
| ETHERNET SEGMENT IDENTIFIER (10 OCTETS)   *504* |
| ETHERNET TAG ID (4 OCTETS)   *506* |
| MAC ADDRESS LENGTH (1 OCTETS)   *602* |
| MAC ADDRESS (6 OCTETS)   *604* |
| IP ADDRESS LENGTH (1 OCTETS)   *606* |
| IP ADDRESS (0, 4, OR 16 OCTETS)   *608* |
| MPLS LABEL1 (3 OCTETS)   *610* |
| MPLS LABEL2 (0 OR 3 OCTETS)   *612* |

EVPN IMPLICIT ALIASING

TECHNICAL FIELD

The present disclosure relates to operating a Virtual Private Network (VPN) service. In particular, operating an Ethernet Virtual Private Network (EVPN).

BACKGROUND

In an EVPN network, a service provider network may provide multi-homed service (e.g., to provide network, node-, link-, and port-redundancy for service providers) to customer networks via provider edge (PE) devices (e.g., router or switches) located at an edge of the service provider network. Aliasing can occur where a customer edger (CE) device is multi-homed to multiple PE devices, and a remote PE device associatively linked to the CE device learns only a subset of the MAC addresses associated with the multiple PE devices. For a given Ethernet Segment (ES), this can lead to a situation where the remote PE device cannot effectively load balance traffic among the PE nodes connected to a multi-homed ES. Although standards such as RFC 7432 published though the IETF (Internet Engineering Task Force) provides for explicit aliasing operations that facilitate a remote PE device to send traffic to multiple peering PE devices of a given Ethernet Segment via ECMP (Equal-cost multi-path routing) (e.g., by explicitly signaling PEs that have reachability to given EVPN instance (EVI) on a given Ethernet Segment (ES) when the PE has not learned MAC addresses from that EVI/ES), the explicit aliasing operations is optional and employs transmission of an Ethernet Auto Discover (EAD) per EVPN instance (EVI) route (also referred to as a "per EVI/EAD route"). That is, a given manufacturer of a PE device may decide not to provide support use of per EVI/EAD route, resulting in incompatibility that can cause traffic to be transmitted to only a subset of the peering PE devices (i.e., in a non-ECMP manner) when ECMP (Equal-cost multi-path routing) is enabled. ECMP is a routing strategy where next-hop packet forwarding to a single destination can occur over multiple "best paths" per a defined routing metric. RFC 7432 "BGP MPLS-Based Ethernet VPN" is incorporated by reference herein in its entirety.

BGP (Border Gateway Protocol) is an inter-autonomous system routing protocol and is used to exchange routing information for the Internet, e.g., among Internet Service Providers (ISPs). BGP neighbors exchange routing information when a TCP connection between neighbors is first established. When a change to the routing table is detected, the BGP router send to its neighbors only those routes that have changed, and updates that are advertised include only the optimal path to a destination network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Presented herein is an exemplified system and method that provides EVPN implicit aliasing by making a union of all MACs reachability information that can be correlated from packets received at a provider edge (PE) device for a given EVI (EVPN Instance) and ESI (Ethernet Segment Instance). To this end, the exemplified system and method facilitates defining the route resolution of a given EVI and ESI as the UNION of all reachability information from all MACs coming from a same EVI and a same ESI. This union facilitates a multi-homed service implementation (e.g., for node-, link-, and port-redundancy) which does not require route resolution to be performed per MAC to provide better performance at higher scale. To this end, RFC7432-compliant devices in which manufacturers of such devices opted to not support Ethernet AD per EVI routes (which is optional) can be made interoperable with devices with such support, thereby decreasing the complexity of implementing a diversified network and facilitating scaling with the inclusion of these diverse devices. To this end, the exemplified system and method facilitates use of hardware from any vendors regardless of the vendor's support for aliasing operations.

In an aspect, an apparatus (e.g., a first border/edge node such as an aggregation service router, switch, or host) is disclosed. The apparatus includes one or more network ports; a processor operatively coupled to the one or more network ports; and a memory having instructions stored, thereon, wherein the instructions, when executed by the processor, cause the processor to, in response to receiving i) a first EVPN advertisement associated with either a first EVI (EVPN instance) or a first ESI (Ethernet Segment Identifier) from a first network device (e.g., a first PE), wherein the first EVPN advertisement comprises reachability information (e.g., a first network identifier such as a MAC address or IP address) associated with the first EVI or the first ESI for the first network device and ii) a second EVPN advertisement associated with either the first EVI (EVPN instance) or the first ESI (Ethernet Segment Identifier) from a second network device (e.g., a second PE), wherein the second EVPN advertisement comprises reachability information (e.g., a second network identifier such as a MAC address or IP address) associated with the first EVI or the first ESI for the second network device, join the reachability information associated with the first network device and the second network device such that traffic later transmitted in association with the first EVI or the first ESI are routable to both the first network device and the second network device.

A provider edge (PE) device is a network device (e.g., a PE router or a router/switch configured to operate with more than one routing protocol, e.g., BGP, OSPF, MPLS) located at the edge of the service provider network. As used herein, a PE device can refer to a TOR ("Top-of-Rack") network device, an EOR ("End of Rack") network device, or access switches that form a leaf layer, and any routing or switching device having an addressable identifier that is used in a network of a datacenter or a network of a service provider.

In some embodiments, the reachability information associated with the first network device and the second network device are implicitly joined by: correlating, at the apparatus, network identifiers that are defined in a MPLS label of a received EVPN traffic received from two or more multi-homed devices, the received EVPN traffic comprising the first EVPN advertisement and the second EVPN advertisement; and associating, at the apparatus, the correlated network identifier to the first EVI or the first ESI.

In some embodiments, the first EVPN advertisement and or the second EVPN advertisement comprises a per MAC-VRF label assignment (e.g., as defined in RFC7432).

In some embodiments, the first EVPN advertisement and or the second EVPN advertisement comprises a per <MAC-VRF, Ethernet Tag> label assignment (e.g., as defined in RFC7432).

In some embodiments, the first EVPN advertisement and or the second EVPN advertisement comprises a per <ESI, Ethernet tag> label assignment (e.g., as defined in RFC7432).

In some embodiments, the first EVPN advertisement comprises a first type of EVPN label assignment, and the second EVPN advertisement comprises a second type of EVPN label assignment, the first type of EVPN label assignment being different from the second type of EVPN assignment.

In some embodiments, the first EVPN advertisement comprises a first type of EVPN label assignment, and the second EVPN advertisement comprises a second type of EVPN label assignment, the first type of EVPN label assignment being the same as the second type of EVPN assignment.

In some embodiments, the instructions that join the reachability information associated with the first network device and the second network device comprises instructions, which when executed by the processor, cause the processor to perform a union operation of all MACs reachability information for a given EVI (EVPN instance) or a given ESI (Ethernet Segment Identifier).

In some embodiments, the instruction when executed by the processor, cause the processor to, in response to receiving the first EVPN advertisement with the first EVI (EVPN instance) or the first ESI (Ethernet Segment Identifier) from the first network device, establish, via the one or more network ports, an EVPN-based interface with the first network device.

In some embodiments, the apparatus is either an aggregations service router, a switch, or a host.

In some embodiments, the instructions further cause the processor to, in response to receiving a third EVPN advertisement associated with an Ethernet AD per EVI route in which the Ethernet AD per EVI route comprises reachability information that includes two or more network identifiers (e.g., MAC addresses or IP addresses) associated, at least, a third network and a fourth network device, establish an association between the two or more network identifiers and the Ethernet AD per EVI route such that traffic later transmitted (e.g., via ECMP (Equal-cost multi-path routing)) in association with the Ethernet AD per EVI route are routable to both the third network device and the fourth network device.

In some embodiments, the instructions when executed by the processor, further cause the processor to, in response to receiving i) a fourth EVPN advertisement associated with either a second EVI (EVPN instance) or a second ESI (Ethernet Segment Identifier) from a fifth network device (e.g., a fifth PE), wherein the fourth EVPN advertisement comprises reachability information (e.g., a fifth network identifier such as a MAC address or IP address) associated with the second EVI or the second ESI for the fifth network device and ii) a fifth EVPN advertisement associated with either the second EVI (EVPN instance) or the second ESI (Ethernet Segment Identifier) from a sixth network device (e.g., a sixth PE), wherein the fifth EVPN advertisement comprises reachability information (e.g., a sixth network identifier such as a MAC address or IP address) associated with the second EVI or the second ESI for the sixth network device, join the reachability information associated with the fifth network device and the sixth network device such that traffic later transmitted in association with the second EVI or the second ESI are routable to both the fifth network device and the sixth network device.

In another aspect, a method (e.g., operated at a first border/edge node such as an aggregation service router, switch, or host) is disclosed. The method includes in response to receiving, at a network device, i) a first EVPN advertisement associated with either a first EVI (EVPN instance) or a first ESI (Ethernet Segment Identifier) from a first network device (e.g., a first PE), wherein the first EVPN advertisement comprises reachability information (e.g., a first network identifier such as a MAC address or IP address) associated with the first EVI or the first ESI for the first network device and ii) a second EVPN advertisement associated with either the first EVI (EVPN instance) or the first ESI (Ethernet Segment Identifier) from a second network device (e.g., a second PE), wherein the second EVPN advertisement comprises reachability information (e.g., a second network identifier such as a MAC address or IP address) associated with the first EVI or the first ESI for the second network device, joining the reachability information associated with the first network device and the second network device such that traffic later transmitted, from the network device, in association with the first EVI or the first ESI are routable to both the first network device and the second network device.

In some embodiments, the first EVPN advertisement and or the second EVPN advertisement comprises an EVPN label, in which the EVPN label is either a per MAC-VRF label assignment (e.g., as defined in RFC7432), a per <MAC-VRF, Ethernet Tag> label assignment (e.g., as defined in RFC7432), or a per <ESI, Ethernet tag> label assignment (e.g., as defined in RFC7432).

In some embodiments, the first EVPN advertisement comprises a first type of EVPN label assignment, and the second EVPN advertisement comprises a second type of EVPN label assignment, the first type of EVPN label assignment being different from the second type of EVPN assignment.

In some embodiments, the first EVPN advertisement comprises a first type of EVPN label assignment, and the second EVPN advertisement comprises a second type of EVPN label assignment, the first type of EVPN label assignment being the same as the second type of EVPN assignment.

In some embodiments, the operation of operation of joining the reachability information associated with the first network device and the second network device includes performing a union operation of all MACs reachability information for a given EVI (EVPN instance) or a given ESI (Ethernet Segment Identifier).

In some embodiments, the method includes in response to receiving the first EVPN advertisement with the first EVI (EVPN instance) or the first ESI (Ethernet Segment Identifier) from the first network device, establishing, via the one or more network ports, an EVPN interface with the first network device.

In some embodiments, the method includes in response to receiving, at the network device, i) a fourth EVPN advertisement associated with either a second EVI (EVPN instance) or a second ESI (Ethernet Segment Identifier) from a fifth network device (e.g., a fifth PE), wherein the fourth EVPN advertisement comprises reachability information (e.g., a fifth network identifier such as a MAC address or IP address) associated with the second EVI or the second ESI for the fifth network device and ii) a fifth EVPN advertisement associated with either the second EVI (EVPN instance) or the second ESI (Ethernet Segment Identifier) from a sixth network device (e.g., a sixth PE), wherein the fifth EVPN advertisement comprises reachability information (e.g., a sixth network identifier such as a MAC address or IP address) associated with the second EVI or the second ESI for the sixth network device, joining the reachability information associated with the fifth network device and the sixth network device such that traffic later transmitted in association with the second EVI or the second ESI are routable to both the fifth network device and the sixth network device.

In some embodiments, the method includes in response to receiving, at the network device, a third EVPN advertisement associated with an Ethernet AD per EVI route in which the Ethernet AD per EVI route comprises reachability information includes two or more network identifiers (e.g., MAC addresses or IP addresses) associated with corresponding two or more network identifiers associated with, at least, a third network and a fourth network device, establishing an association between the two or more network identifiers and the Ethernet AD per EVI route such that traffic later transmitted (e.g., via ECMP (Equal-cost multi-path routing)) in association with the Ethernet AD per EVI route are routable to both the third network device and the fourth network device.

In another aspect, a non-transitory computer readable medium is disclosed. The computer readable medium includes instructions stored thereon, wherein execution of the instructions by a processor, cause the processor of a computing device (e.g., a provider edge device) to: in response to receiving i) a first EVPN advertisement associated with either a first EVI (EVPN instance) or a first ESI (Ethernet Segment Identifier) from a first network device (e.g., a first PE), wherein the first EVPN advertisement comprises reachability information (e.g., a first network identifier such as a MAC address or IP address) associated with the first EVI or the first ESI for the first network device and ii) a second EVPN advertisement associated with either the first EVI (EVPN instance) or the first ESI (Ethernet Segment Identifier) from a second network device (e.g., a second PE), wherein the second EVPN advertisement comprises reachability information (e.g., a second network identifier such as a MAC address or IP address) associated with the first EVI or the first ESI for the second network device, join the reachability information associated with the first network device and the second network device such that traffic later transmitted in association with the first EVI or the first ESI are routable to both the first network device and the second network device.

Example Network

Figure 1:
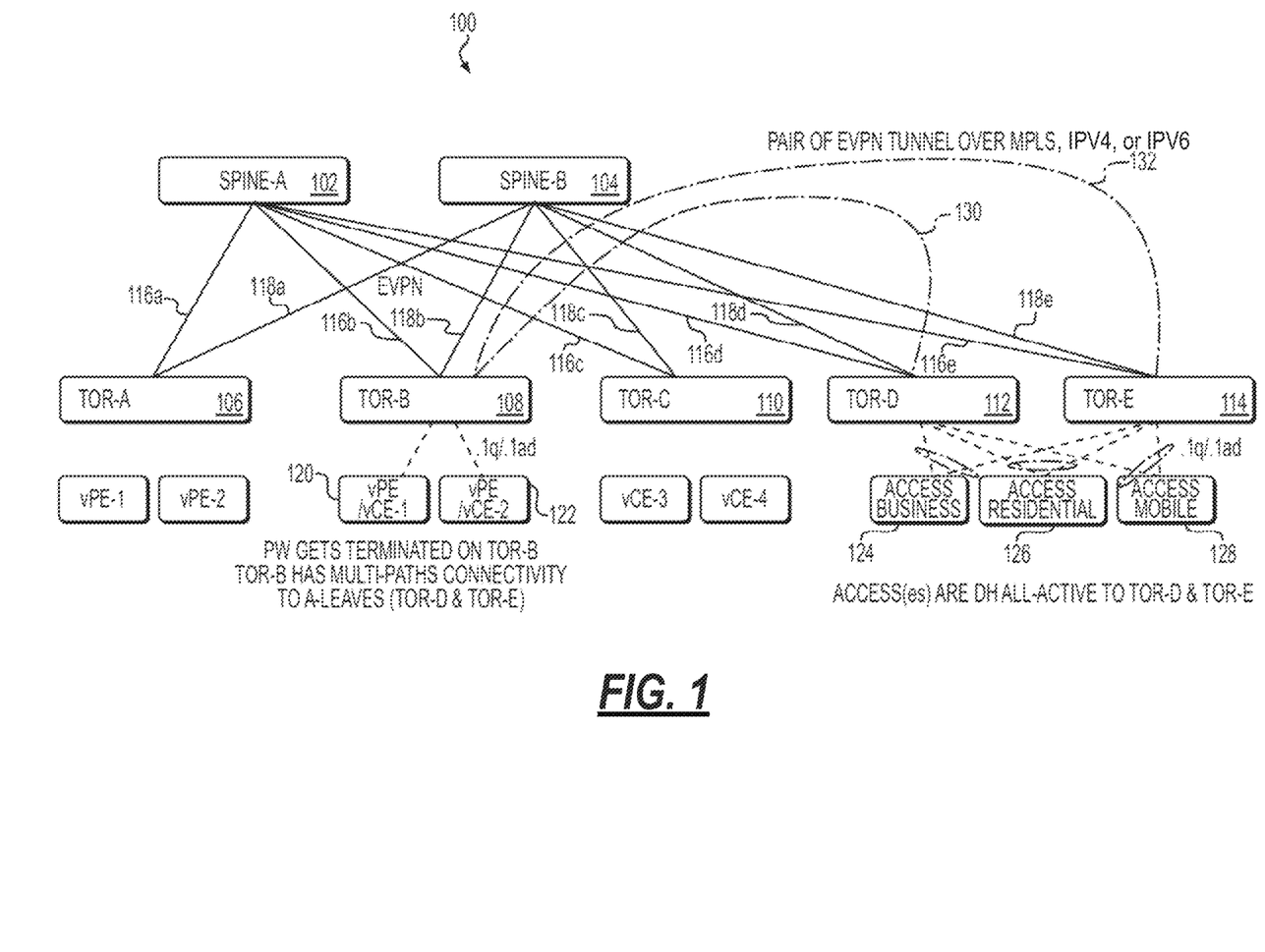
FIG. 1 is a diagram illustrating an example network that includes one or more network devices configured to establishing an EVPN interface, in accordance with an embodiment.

FIG. 1 is a diagram illustrating an example network 100 that includes one or more network devices configured to establish an EVPN interface (e.g., EVPN-based (Integrated Routing and Bridging interface), in accordance with an embodiment. As shown in FIG. 1, as a non-limiting example, a network 100 includes a plurality of spine nodes (e.g., router or switches) (shown as "Spine-A" 102 and "Spine-B" 104) that are coupled to a plurality of nodes (e.g., router or switches) (shown as "TOR-A" 106, "TOR-B" 108, "TOR-C" 110, "TOR-D" 112, and "TOR-E" 114) across a number of EVPN (Ethernet Virtual Private Network) links (shown as 116a-116e and 118a-118e). This topology may be found, for example, but not limited to, in a Data Center Fabric or MPLS cloud.

As shown in FIG. 1, node "TOR-B" 108 is operatively connected, via pseudowire, to a plurality of edge devices including a first edge device 120 (shown as "vPE/vCE-1" 120) and a second edge device 122 (shown as "vPE/vCE-2" 122). The edge devices 120, 122 of node "TOR-B" 108 communicate, over a pair of EVPN tunnel (shown as 130 and 132) over MPLS (Multi-protocol Label Switching), to a plurality of access layer nodes (shown as "Access Business" node 124; "Access Residential" node 126; and "Access Mobile" node 128) attached to node "TOR-D" 112 and to node "TOR-E" 114. The access layer nodes are multi-homed to two or more PEs (e.g., 120, 122), which collectively form a redundancy group that can forward traffic to/from the multi-homed device for a given VLAN. This multi-homing or redundancy is also referred to as "All-Active".

It should be appreciated that FIG. 1 is provided as a non-limiting example to demonstrate the various embodiments disclosed herein. Other network topologies may be used—for example, other customer edge devices or provider edge devices may be used with the embodiments disclosed herein.

Figure 2:
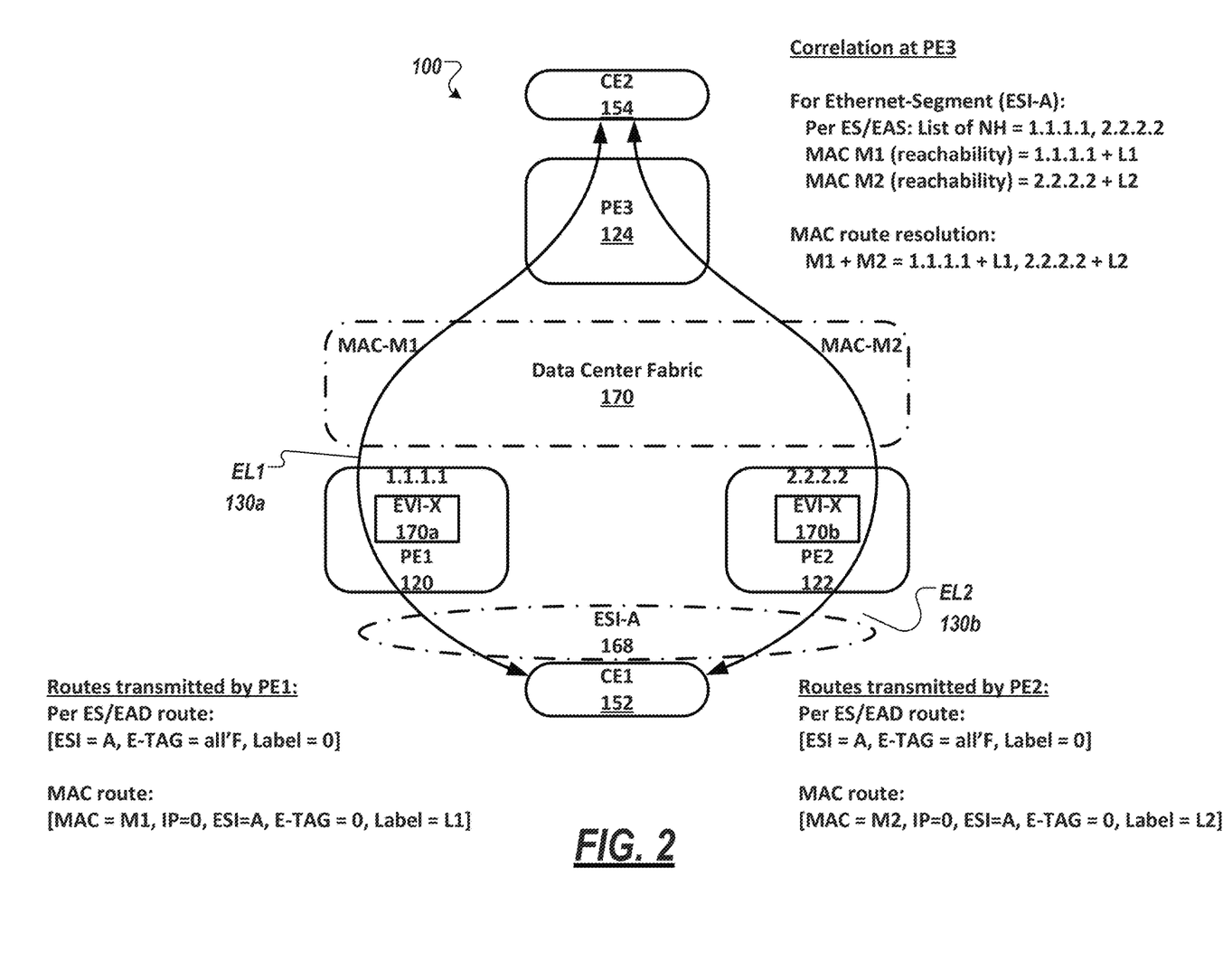
FIG. 2 is a diagram illustrating an example network that includes one or more network devices configured to support implicit EVPN aliasing, in accordance with an illustrative embodiment.

FIG. 2 is a diagram illustrating a multi-homed EVPN interface that is configured with implicit EVPN aliasing operation, e.g., over the network of FIG. 1, in accordance with an embodiment. As shown in FIG. 2, as a non-limiting example, customer edge (CE) devices (e.g., router or switches) (shown as "CE1" 152 and "CE2" 154) are multi-homed, with all-redundancy operations, via "PE1" device 120 and to a "PE2" device 122 associatively connected to a "PE3" device (e.g., 124, 126, or 128) over a MPLS core network 170 (shown as "MPLS" 170). As used herein, a customer edge (CE) device is a host device, a router, or a switch, or other network device that may be used as a bridge between networks. As used herein, a provider edge (PE) is a host device, a router, or a switch, or other network device that may be used to provide virtual Layer-2 bridged connectivity between the customer edge devices (CEs).

Referring still to FIG. 2, the "CE1" device 152 is associatively connected to the "PE1" device 122 via a first Ethernet link (shown as "EL1" 130a) and to the "PE2"

device 122 via a second Ethernet link (shown as "EL2" 130b), which collectively form an Ethernet Segment (ES). The Ethernet Segment has a corresponding Ethernet Segment identifier (ESI) shown, in this example, as "ESI-A" 168. As shown in FIG. 2, each PE device (e.g., 120, 122) executes an EVPN instance (EVI) 170 (shown as "EVI-X" 170a and 170b) for "ESI-A" 168, which is a broadcast domain that spans the provider edge devices participating in "ESI-A" 168. Although FIG. 2 shows, in this example, the "ESI-A" 168 being associated with the "PE1" device 120 and the "PE2" device 122, the "ESI-A" 168 can be associated with more than two network nodes in a given redundancy group. In some embodiments, the multi-homed EVPN interface is configured with implicit EVPN aliasing operation that operates with up to four network nodes in the redundancy group. In some embodiments, the multi-homed EVPN interface is configured with implicit EVPN aliasing operation that operates with more than four network nodes in the redundancy group. In some embodiments, the number of network nodes in the redundancy group is configurable.

Figure 3:
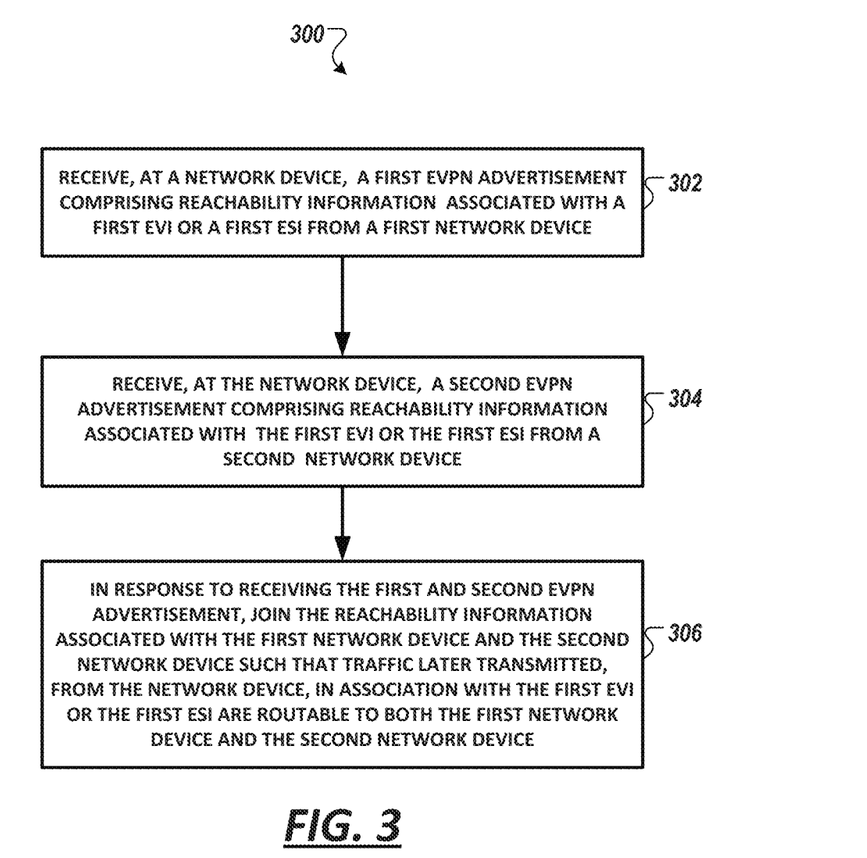
FIG. 3 illustrates an example method of operating implicit aliasing in an EVPN network having provider edge nodes in an MPLS infrastructure, in accordance with an illustrative embodiment.

FIG. 3 illustrates an example method of 300 of operating implicit aliasing in an EVPN network, in accordance with an illustrative embodiment. The method 300 includes a network device (e.g., a first border/edge node such as an aggregation service router, switch, or host) receiving (operation 302) a first EVPN advertisement route (e.g., a EVPN Route Type 2) associated with either a first EVI (EVPN instance) or a first ESI (Ethernet Segment Identifier) from a first network device (e.g., a first PE device), in which the first EVPN advertisement comprises reachability information (e.g., a first network identifier such as a MAC address or IP address) associated with the first EVI or the first ESI for the first network device. In some embodiments, the EVPN Route Type-2 is broadcasted with two BGP Extended Communities for, and by, each network device (e.g., PE devices) associated with the ESI—including a first BGP Extended Community that identifies the tunnel type as "Type 2" and a second BGP Extended Community that includes the MAC address of the network device (e.g., for "PE1" device and the "PE2" device).

As shown in FIG. 2, in that example, the "PE1" device 120 broadcasts, over link "ELF 1" 130a, a per ES/EAD route having an associated Ethernet Segment identifier (shown as "ESI-A"). The Ethernet Segment identifier, in some embodiments, is a 10-octet entity that is described in RFC7432. As an ES/EAD route, the MPLS label in the NLRI is set to "0", and the Ethernet Tag ID is set to a maximum of all 0xF (in hexadecimal). Subsequently, the "PE1" device 120 broadcasts a MAC/IP advertisement route, e.g., an EVPN Route Type-2, having a MAC address (shown as "MAC=M1") and having a MPLS label with a first value (shown as "Label=L1"). As a MAC/IP advertisement route, the Ethernet Tag ID in the NLRI is set to zero or to a valid Ethernet Tag ID (e.g., the CE VLAN ID or the provider VLAN ID), and the IP address length is set to 0. Upon the "PE3" device 124 receiving the ES/EAD route and MAC/IP advertisement route broadcasted by "PE1" 120, the "PE3" device 124 stores the Ethernet Segment identifier "ESI-A" in association with the MAC address ("MAC=M1") associated with the "PE1" device, thereby associating the 0 link "EL1" 130a with the MAC address "MAC-M1", which is shown as "1.1.1.1". The EVPN Route Type-2 (e.g., broadcasted by the "PE1" device) may carry Layer-2 information (MAC address) or Layer-2 in combination with Layer-3 information (e.g., MAC address and IP address (IPv4 or IPv6)) in the EVPN.

Referring back to FIG. 3, the method 300 includes the network device receiving (operation 304) a second EVPN advertisement associated with either the first EVI (EVPN instance) or the first ESI (Ethernet Segment Identifier) from a second network device (e.g., a second PE), in which the second EVPN advertisement comprises reachability information (e.g., a second network identifier such as a MAC address or IP address) associated with the first EVI or the first ESI for the second network device, in which the second EVPN advertisement comprises reachability information (e.g., a second network identifier such as a MAC address or IP address) associated with the first EVI or the first ESI for the second network device.

As shown in FIG. 2, in that example, the "PE2" device 122 broadcasts, over link "EL2" 130b, a per ES/EAD route having the associated Ethernet Segment identifier "ESI-A"). The broadcasted ES/EAD route also include a MPLS label that is set to "0" and the Ethernet Tag ID set to a maximum of all 0xF (in hexadecimal). Subsequently, the "PE2" device 122 broadcasts a MAC/IP advertisement route, e.g., an EVPN Route Type-2, having a MAC address (shown as "MAC=M2") and having a MPLS label with a second value (shown as "Label=L2"). The EVPN Route Type-2 (e.g., broadcasted by the "PE2" device) may carry Layer-3 information (e.g., IP address) in the EVPN.

Referring back to FIG. 3, the method 300 includes, in response to receiving the first EVPN advertisement route and the second EVPN advertisement route, the network device joining (operation 306) the reachability information associated with the first network device and the second network device such that traffic later transmitted, from the network device, in association with the first EVI or the first ESI are routable to both the first network device and the second network device.

As shown in FIG. 2, upon the "PE3" device 124 receiving the ES/EAD route and MAC/IP advertisement route broadcasted by "PE2" 122, the "PE3" device 124 correlates the existing Ethernet Segment identifier "ESI-A" in association with MAC address ("MAC=M2") associated with the "PE2" device 122, thereby associating the link "EL2" 130b with the MAC address "MAC-M2", which is shown as "2.2.2.2". As a result, and as shown in FIG. 2, for the Ethernet Segment "ESI-A", the "PE3" device 124 joins, via the exemplified implicit aliasing operation, the reachability information of the "PE1" device 120 and the "PE2" device 122 per the correlated Ethernet Segment identifier "ESI-A" to provide a MAC route resolution to both the "PE1" device 120 and the "PE2" device 122. As shown, the joined MAC route resolution (shown as "M1+M2" for the Ethernet Segment identifier "ESI-A" is i) the MAC address "1.1.1.1" associated with label "L1" and ii) the MAC address 2.2.2.2 associated with label "L2." To this end, a packet, e.g., sent from the "CE2" device 154 to "CE1" device 152, having an associated MAC address "1.1.1.1", an associated MAC address "2.2.2.2", a MPLS label "L1" or a MPLS label "L2" would be directed, in All-Active Redundancy mode, to both the "PE1" device 120 and the "PE2" device 122 over the links "EL1" 130a and "EL2" 130b, respectively, e.g., via ECMP (Equal-Cost Multi-Path Routing).

Because the exemplified methods and systems do not employ specific optional provisions of IETF RFC 7432, implicit aliasing facilitates interoperability with network devices that are compliant with the IETF RFC 7432 (e.g., legacy devices) and with network devices in which the manufacturer has decided not to enable the optional explicit aliasing (e.g., of using EVI/EAD route) specified therein.

It is noted that implicit aliasing also applied, in some embodiments, to Layer 3 information (e.g., IP address) of a given EVPN Route Type 2. In such instances, the implicit aliasing operations can work with IPv4 and IPv6 networks.

Referring still to FIG. 2, in this example, the remote 'PE3" device 124 is configured to join the reachability information from a first PE device (e.g., "PE1" 120) and a second PE device (e.g., "PE2" 122) by associatively combining label assignments parameters from a first EVPN advertisement received from the first PE device (e.g., "PE1" 120) and label assignments parameters from a second EVPN advertisement received from the second PE2 device (e.g., "PE2" 122) and associating the reachability information from these EVPN advertisements to a EVI (e.g., an EVI identifier) or a ESI (e.g., an Ethernet Segment identifier). The label assignment may be based on a per MAC-VRC label assignment, a per <MAC-VRF, Ethernet tag> label assignment, and a per <ESI, Ethernet tag> label assignment.

Per MAC-VRF Label Assignment

In some embodiments, a PE device may advertise the same single EVPN label for all MAC addresses in a given MAC-VRF (i.e., a Virtual Routing and Forwarding table for MAC addresses on a PE device). This label assignment is referred to as a per MAC-VRF label assignment. An assignment per MAC-VRF label requires the least number of EVPN labels but requires a MAC lookup in addition to an MPLS lookup on an egress PE for forwarding. MAC-VRF table that is associated with a given PE device has a unique label assignment and includes reachability information for a given PE device such as L2 (MAC address) and L3 (IP address) information.

Per <MAC-VRF, Ethernet Tag> Label Assignment

In some embodiments, a PE may advertise a unique EVPN label per <MAC-VRF, Ethernet tag> combination. This label assignment is referred to as a per <MAC-VRF, Ethernet tag> label assignment. A unique label per <ESI, Ethernet tag> allows an egress PE to forward a packet that it receives from another PE, to the connected CE, after looking up only the MPLS labels without having to perform a MAC lookup. This includes the capability to perform appropriate VLAN ID translation on egress to the CE. See RFC 7432 at section 9.2.1. Similar to a MAC-VRF table, a MAC-VRF table that is associated with a given Ethernet tag has a unique label assignment and includes reachability information for a given PE device such as L2 (MAC address) and L3 (IP address) information.

Per <ESI, Ethernet Tag> Label Assignment

In some embodiments, a PE may advertise a unique EVPN label per <ESI, Ethernet tag> combination. This label assignment is referred to as a per <ESI, Ethernet tag> label assignment. An Ethernet Segment Instance that is associated with a given Ethernet tag has a unique label assignment and includes reachability information for remote PE devices, such as L2 (MAC address) and L3 (IP address) information, associated with the Ethernet Segment Instance.

It is contemplated that other label assignments that uniquely associates a network identifier of a PE device (e.g., L2 and/or L3 information) and an identifier associated with an Ethernet Segment may be used.

It is further contemplated that if aliasing is not supported by the "PE3" device 124, e.g., either by implicit aliasing as described herein or by per EVI/EAD aliasing as described in RFC 7432, then the "PE3" device would send traffic to MAC address "M1" associated with the "PE1" device 120 or to MAC address "M2" associated with the "PE2" device 122 only via their respective PE next hop. That is, to only one link "EL1" 130a or "EL2" 130b.

It should be appreciated that FIG. 2 is provided as a non-limiting example to demonstrate the various embodiments disclosed herein. For example, other label assignments may be used. In addition, other network topologies may be used—for example, other Data Center Fabric or cloud networks or other customer edge devices or provider edge devices.

As discussed in RFC7432, in All-Active redundancy, when aliasing operation is not present or is optionally enabled, when using Link Aggregation Group (LAG), a single PE can learn only a subset of MAC addresses associated with LAG intermediary devices that carry traffic transmitted by CE device (e.g. "CE1" 152). This can lead to a situation where remote PE nodes (e.g. "PE3" device 110) can receive MAC or IP Advertisements routes information for only a single PE device (e.g., "PE1" device 120 or"PE2" device 122), for example, when ARP (Address Resolution Protocol) traffic (for IPv4 networks) is hashed to a single link the LAG, even though multiple PEs (e.g. "PE1" and "PE2" devices 120, 122) are associatively connected to a Link Aggregation Group via the multi-homed Ethernet segment (e.g., ESI 168). As a result, the remote PEs (e.g., PE3 110) are not able to effectively load balance traffic among the PE nodes (e.g., "PE1" 120, and "PE2" 122) connected to a multi-homed Ethernet segment. The same scenario can also occur for ND (Network Discovery) traffic (for IPv6 networks).

Example Operation

Figure 4:
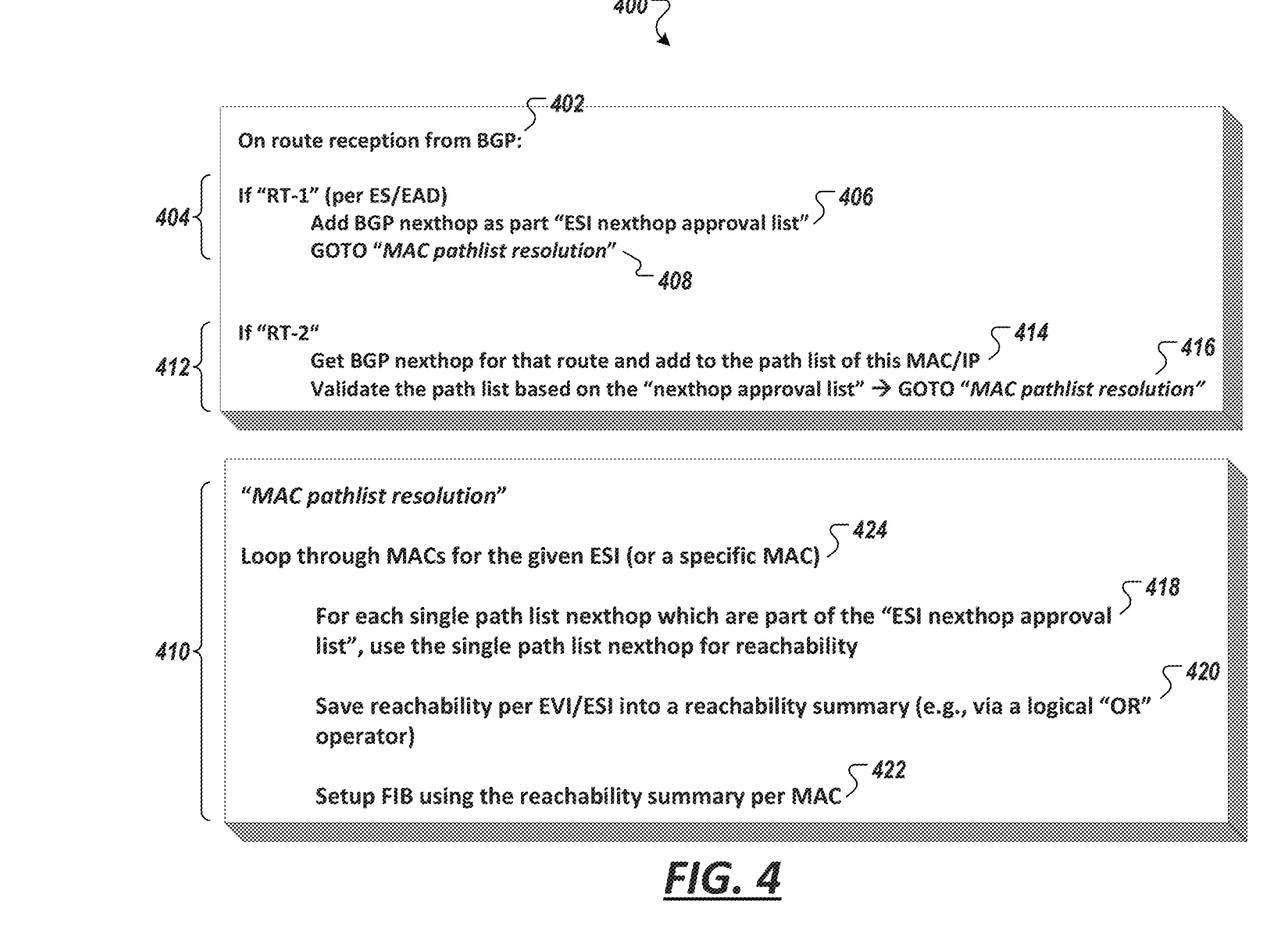
FIG. 4 shows a diagram of a control operation at a network device (e.g., a remote PE) for implicit aliasing, in accordance with an illustrative embodiment.

FIG. 4 shows a diagram of a control operation 400 at a network device (e.g., a remote PE) for implicit aliasing, in accordance with an illustrative embodiment.

As shown in FIG. 4, upon receiving (operation 402) a route traffic from BGP (Border Gateway Protocol) at a given network node (e.g., the "PE3" device in the example of FIG. 2), e.g., having a matching target route, the network node is configured to parse the received route traffic. If the route traffic defines an EVPN Route "Type 1" (per ES/EAD) (operation 404), for a given ESI/EVI, the network node is configured to store (operation 406) the BGP nexthop information (e.g., in the NLRI) by adding the BGP nexthop information to the ESI nexthop approval list (which is associated with a given ESI) and then executes (operation 408) the "MAC pathlist resolution" operation 410. The "MAC pathlist resolution" operation 410, in some embodiments, includes evaluating (per MAC) the "ESI nexthop approval list" (also referred to as per ES/EAD); for a given ESI/EVI, evaluating (per MAC) the reachability per EVI/ESI and savings it to a reachability summary; and configuring a routing table based on the reachability summary.

If the route traffic defines an EVPN Route "Type 2" (operation 412), for a given ESI/EVI, the network node requests for the BGP nexthop information for that route and then add the requested BGP nexthop information to the pathlist of this MAC/IP (operation 414). The network node then validates the pathlist using the "nexthop approval list" and, if matching, executes the "MAC pathlist resolution" operation 410 (operation 416).

Referring still to FIG. 4, the "MAC pathlist resolution" operation 410 includes, for each MAC, evaluating (per MAC) the "ESI nexthop approval list" (also referred to as per ES/EAD) (418); for a given ESI/EVI, evaluating (per MAC) the reachability information per EVI/ESI and generating a reachability summary by combining, or appending, (e.g., via a logical "OR" operation and etc.) of the applicable reachability information to (operation 420); and configuring a routing table based on the reachability summary (operation 422). In some embodiments, the operation (e.g., 412, 414, 416) is performed per MAC (e.g., 424) (e.g., via a loop operation through a list of broadcasted MAC maintained at the network node). In some embodiments, the reachability information includes Layer-2 information (e.g., MAC address) for the next-hop and an associate MPLS label, as for example, described in relation to FIG. 2 and FIG. 7, and/or Layer-3 information (e.g., IP address). An example of this method is later described in relation to FIG. 8.

Ethernet A-D Per ES Route

Figure 5:
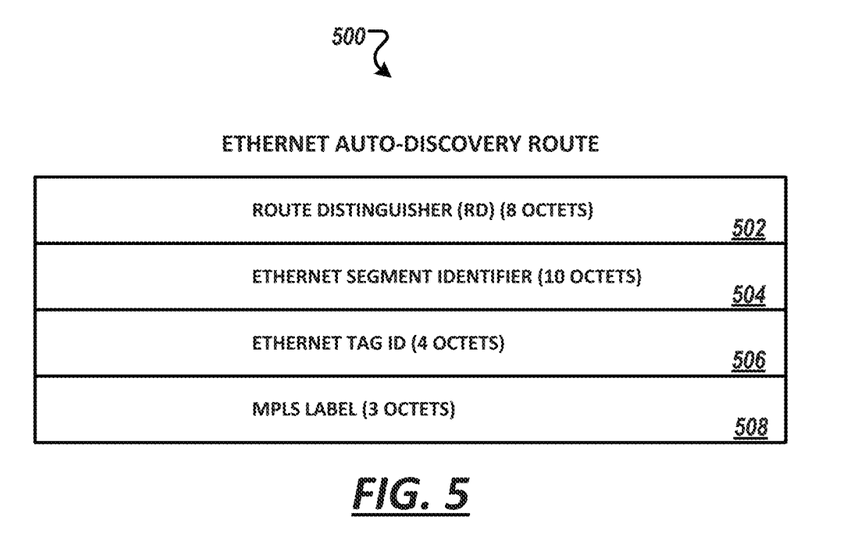
FIG. 5 shows a diagram of a BGP Network Layer Reachability Information (NLRI) (also referred to as an EVPN NLRI) for an Ethernet Auto-Discovery (EAD) Route structure of an Ethernet A-D per ES route.

FIG. 5 shows a diagram of a BGP Network Layer Reachability Information (NLRI) (also referred to as an EVPN NLRI) for an Ethernet Auto-Discovery (EAD) Route structure of an Ethernet A-D per ES route. In an EVPN, MAC learning between provider edge devices (PEs) occurs in the control plane, which is a multi-protocol Broder Gateway Protocol ("MP-BGP") to advertise MAC reachability information.

As shown in FIG. 5, and as discussed in RFC7432, an EAD route-type specific EVPN NLRI includes a Route Distinguisher field 502 (shown as "Route Distinguisher (RD)" 502), an Ethernet Segment Identifier field 504 (shown as "Ethernet Segment Identifier" 504), an Ethernet Tag ID field 506 (shown as "Ethernet Tag ID" 506), and a MPLS label field 508 (shown as "MPLS label" 508). Ethernet Segment Identifier field 504 and Ethernet Tag ID field 506 are considered a prefix in the NLRI for the EAD route. An Ethernet Tag ID is a 32-bit field that contains either a 12-bit or 24-bit identifier.

MAC/IP Advertisement Route

Figure 6:
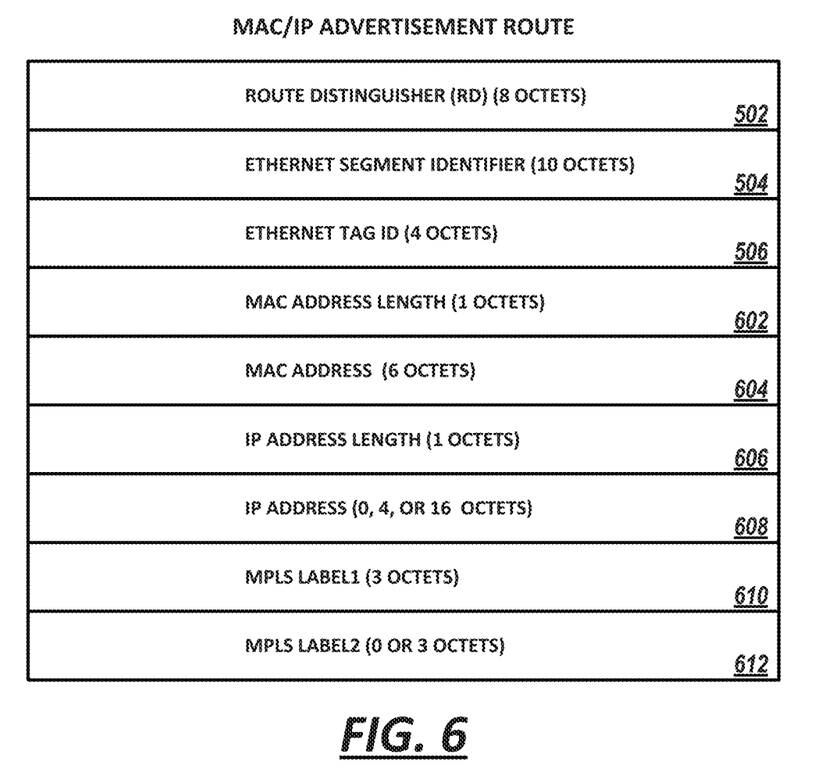
FIG. 6 is a diagram of a BGP Network Layer Reachability Information (NLRI) (also referred to as an EVPN NLRI) for a MAC/IP Advertisement route.

FIG. 6 is a diagram of a BGP Network Layer Reachability Information (NLRI) (also referred to as an EVPN NLRI) for a MAC/IP Advertisement route. As shown in FIG. 6, a MAC/IP Advertising route-type specific EVPN NLRI includes the Route Distinguisher field 502 (shown as "Route Distinguisher (RD)" 502), the Ethernet Segment Identifier field 504 (shown as "Ethernet Segment Identifier" 204), the Ethernet Tag ID field 506 (shown as "Ethernet Tag ID" 506), the MAC Address Length field 602 (shown as "MAC Address Length" 602), a MAC Address field 604 (shown as "MAC Address" 604), an IP Address Length field 606 (shown as "IP Address Length" 606), an IP Address field 608 (shown as "IP Address" 608), a MPLS Label1 field 610 (shown as "MPLS Label1" 610), a MPLS Label2 field 612 (shown as "MPLS Label2" 612).

As discussed in RFC7432, a MAC Address Length is an 8-bit field that is set to a bit value representing the length of a MAC address of a host, the MAC address being associated with a CE device (e.g., CE1 152). The MAC Address Length field is set to 48 for EVPN. The IP Address field is optional. By default, the IP Address Length field is set to 0, and the IP Address field is omitted form the route. If an IP address needs to be advertised, the IP Address it is then encoded in this route. When an IP Address is present, the IP Address Length field is in bits, and is set to 32 or 128 bits. The MPLS Label1 field is a 24-bit field, where the high-order 20 bits contain an assigned label value. The advertising PE uses this label when it receives an MPLS-encapsulated packet to perform forwarding based on the destination MAC address toward the CE. The MPLS Label2 field is an optional field. If it is present, then it is encoded as 24 bit field, where the high-order 20 bits contain the label value.

Explicit and Implicit Aliasing

Figure 7:
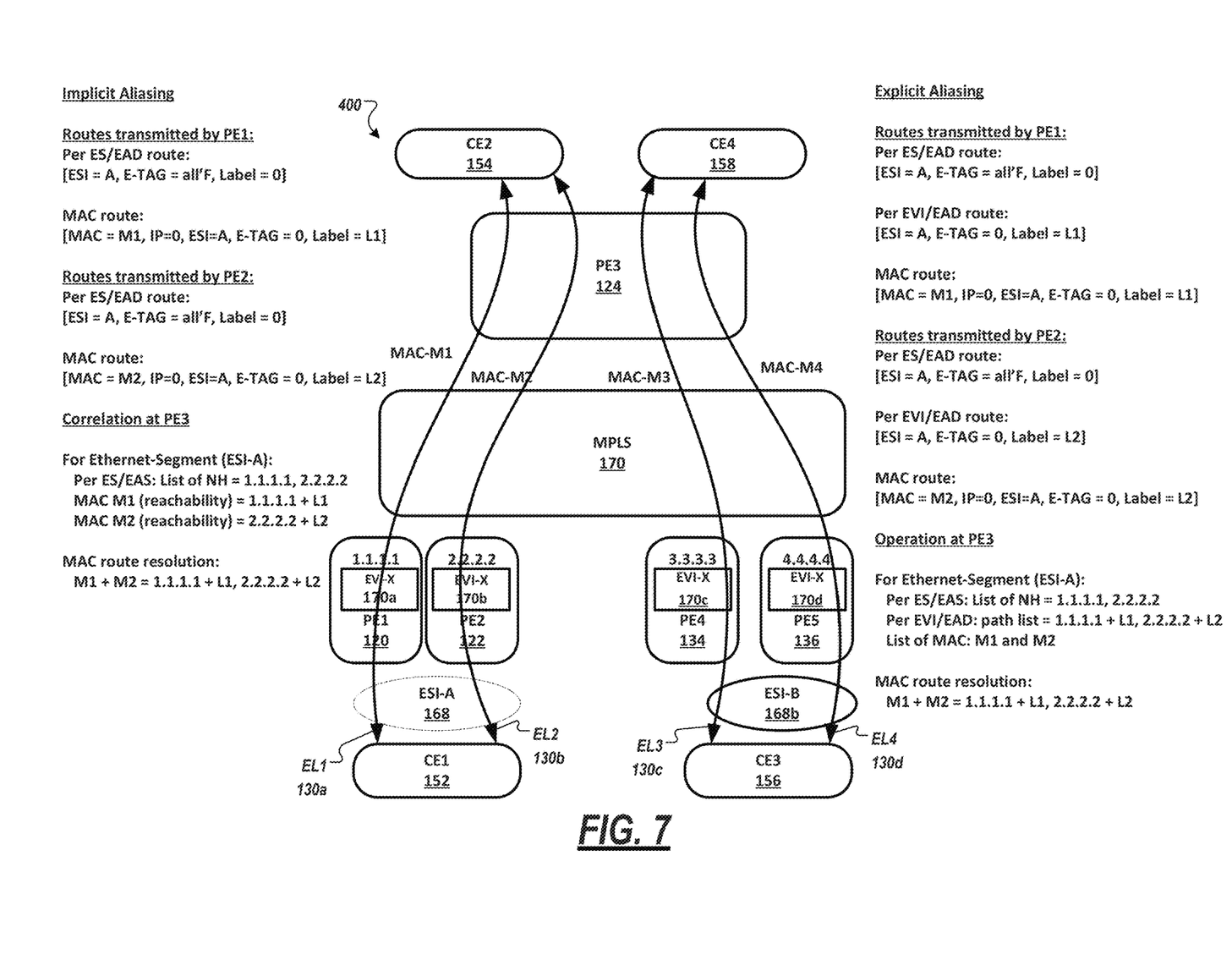
FIG. 7 is a diagram illustrating an example network that includes one or more network devices configured to support implicit aliasing in conjunction with explicit aliasing, in accordance with an illustrative embodiment.

FIG. 7 is a diagram illustrating an example network that includes one or more network devices configured to support implicit aliasing in conjunction with explicit aliasing, in accordance with an illustrative embodiment.

As shown in FIG. 7, as a non-limiting example, the "CE1" 152 is multi-homed to the "CE2" device 154, with all-redundancy operations, via the "PE1" device 120 and the "PE2" device 122 over the MPLS core network 170. The "CE1" device 152 is associatively connected to the "PE1" device 122 via the Ethernet link "EL1" 130a and to the "PE2" device 122 via the second Ethernet link "EL2" 130b, which collectively form the Ethernet Segment "ESI-A" 168. As discussed in relation to FIG. 2, reachability information associated the "PE1" device 120 and the "PE2" device 122 is correlated and combined at the remote "PE3" device 124 via implicit aliasing operations discussed herein.

FIG. 7 further shows explicit aliasing operations, as defined in RFC 7432, at the same remote "PE3" device 124 for a second set of CEs (shown as "CE3" 156 and "CE4" 158. As shown, the "CE3" device 156 is multi-homed to the "CE4" device 158, with all-redundancy operations, via the "PE4" device 134 and the "PE5" device 136. The "CE3" device 156 is associatively connected to the "PE4" device 134 via the Ethernet link "EL3" 130c and to the "PE5" device 136 via the Ethernet link "EL4" 130d, which collectively form the Ethernet Segment "ESI-B" 168b.

To establish the multi-homed operation, via explicit aliasing, the "PE4" device 134 or the "PE5" device 136 is configured to further broadcast an EVPN advertisement associated with an Ethernet A-D per EVI route (per EVI/EAD route) to the remote PE (e.g., PE3 110), in which, the per EVI/EAD route comprises reachability information for the Ethernet Segment—e.g., MAC addresses or other network identifiers for the "PE4" device 134 and the "PE5" device 136.

Although FIG. 7 shows, in this example, the "ESI-A" 168 being associated with the "PE1" device 120 and the "PE2" device 122, and the "ESI-B" 168b being associated with the "PE3" device 134 and the "PE4" device 136, the "ESI-A" 168 and the "ESI-B' 168b can be associated with more than two network nodes in a given redundancy group. In some embodiments, the multi-homed EVPN interface is configured with implicit EVPN aliasing operation that operates with any number of network nodes in the redundancy group. In some embodiments, the multi-homed EVPN interface is configured with explicit EVPN aliasing operation that operates with any number of network nodes in another redundancy group.

Figure 8:
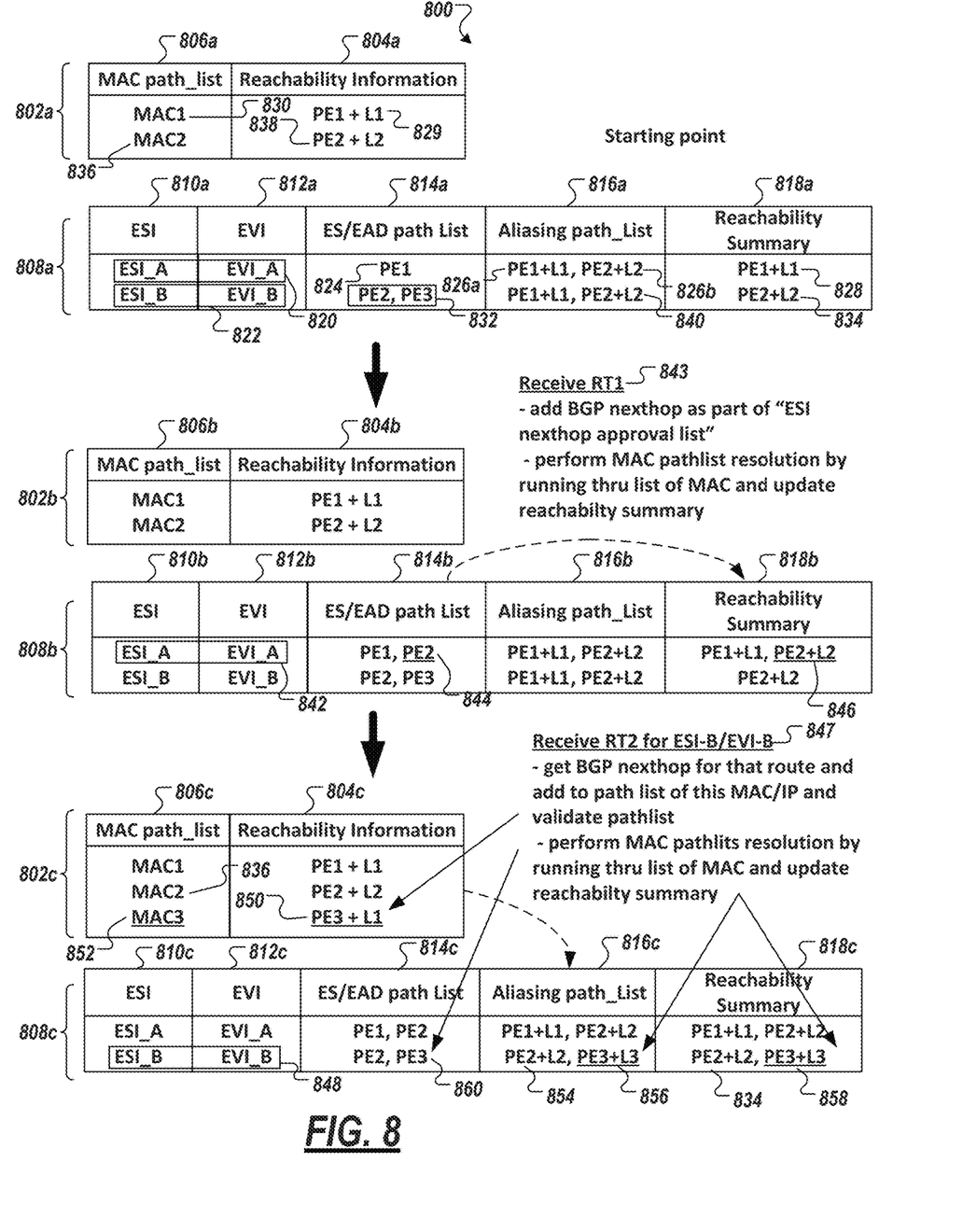
FIG. 8 illustrates an example method of operating an EVPN interface with implicit aliasing operations in an EVPN network, in accordance with an illustrative embodiment.

FIG. 8 illustrates an example method of operating an EVPN interface with implicit aliasing operations in an EVPN network, in accordance with an illustrative embodiment. In FIG. 8, an edge device (e.g., 120, 122) is shown maintaining a first database 802 (each instance of this field in the database is shown as 802a, 802b, and 802c) that includes reachability information field 804 (each instance of this field in the database is shown as 804a, 804b, and 804c) that is keyed, in the database, to a corresponding MAC path_list field 806 (each instance of this field in the database is shown as 806a, 806b, and 806c). That is, for a given MAC path_list value in the field 806, there is corresponding reachability information value, in the field 804, that provides instructions to reach the network device associated with that MAC path_list. In some embodiments, reachability information includes Layer 2 (MAC address) or Layer 3 (IP address) information or next hop routing information.

In FIG. 8, the edge device (e.g., 120, 122) maintains a second database 808 (each instance of the database is shown as 808a, 808b, and 808c) that includes an Ethernet Segment identifier (ESI) field 810 (each instance of this field in the database is shown as 810a, 810b, and 810c) and/or an EVPN instance field 812 (each instance of this field in the database is shown as 812*a*, 812*b*, and 812*c*), which is used as key (i.e., per ESI/EVI) to a corresponding approved ES/EAD path list field 814 (each instance of this field in the database is shown as 814*a*, 814*b*, and 814*c*), a corresponding constructed aliasing path list field 816 (each instance of this field in the database is shown as 816*a*, 816*b*, and 816*c*), and a corresponding constructed reachability summary field 818 (each instance of this field in the database is shown as 818*a*, 818*b*, 818*c*). It is contemplated that the fields in the first and second database 802 and 808 may be organized in sub-databases—for example, the fields shown in the second database 808, in some embodiments, are maintained in multiple databases.

In this example, two instance of ESI/EVI is initially shown ("ESI_A" and EVI_A" 820 and "ESI_B" and "EVI_B" 822). Ethernet Segment or EVPN Instance "ESI_A/EVI_A" 820 has an initial aliasing path_list that includes "PE1+L1" 826*a* (that is, Provider Edge "1" and Label "1") and "PE2+L2" 826*b* (that is, Provider Edge "2" and Label "2"). Because in this example, Ethernet Segment or EVPN Instance "ESI_A/EVI_A" 820 has an initial ES/EAD path list that includes only "PE1" 824, the resulting reachability summary that denotes the path list resolution includes only that associated with "PE1" 824—namely "PE1+L1" 828. To this end, upon an ECMP packet being received at the instant edge device that is directed to "PE1", the received ECMP packet is transmitted, via Ethernet Segment or EVPN Instance "ESI_A/EVI_A" 820, through only "MAC1" 830 per reachability summary "PE1+L1" 829.

In addition, in this example, Ethernet Segment or EVPN Instance "ESI_B/EVI_B" 822 has an initial ES/EAD path list that includes "PE2" and "PE3" 832. The resulting reachability summary includes only that associated with "PE2"—namely "PE2+L2" 834, because the aliasing path_list (e.g., 840) including only "PE1+L1" 836 and "PE2+L2" 838 and not "PE3".

This initial state may have been generated when edge device (e.g., 120, 122) receives, from the "PE1" device associated with "MAC1" 830, a first EVPN advertisement (e.g., a "Route-2" advertisement) associated with either EVPN instance "EVI_A" or Ethernet Segment "ESI_A" that includes reachability information "PE1+L1" 829; from the "PE2" device associated with "MAC2" 836, a second EVPN advertisement (e.g., another "Route Type 2" advertisement) associated with either EVPN instance "EVI_A" or Ethernet Segment "ESI_A" that includes reachability information "PE2+L2" 838; and, from "PE1" device associated with "MAC1" 830, an ES/EAD advertisement (e.g., a "Route Type 1" advertisement) for "PE1". Here, information from each of the "Route Type 2" EVPN advertisement is joined (e.g., via a logical "OR" operation), upon receipt of the EVPN advertisements, to implicitly generate the aliasing path_list 816*b* that includes both "PE1+L1" and "PE2+L2" 826*b*. But, because only "PE1" is listed in the approved ES/EAD path_list, via the "Route Type 1" EVPN advertisement, the reachability summary for "ESI_A" and "EVI_A" includes only "PE1+L1" 838.

Assume now, in another aspect of this example, a "Route Type 1" EVPN advertisement is received (e.g., shown as "RT1" 843) from the "PE2" device for Ethernet Segment "ESI_A" or EVPN instance "EVI_A" 842. The ES/EAD path_list 814*b* is updated with "PE2" 844, as described in relation to FIG. 4. In some embodiments, "PE2" 844 is added as a BGP next hop as part of the "ESI next hop approval list". MAC Path_list resolution operation is then performed by looping thru MACs associated for a given ESI (or a specific MAC) and, for each single path list nexthop which are part of the approved ES/EAD path_list (also referred to as a "next hop approval list"), using the MAC for reachability for that ESI (or that specific MAC). As shown here, the reachability summary 818*b* is updated to additionally include "PE2+L2" 846. The reachability information per EVI/ESI is then saved into the reachability summary (e.g., via a logical "OR"), and the FIB table is setup, per MAC, using the reachability summary.

Assume now, in another aspect of this example, a "Route Type 2" EVPN advertisement is received (e.g., shown as "RT2" 847) from the "PE3" device for Ethernet Segment "ESI_B" or EVPN instance "EVI_B" 848. In the initial state of Ethernet Segment "ESI_B" and EVPN instance "EVI_B" 822 (e.g., 802*a* and 808*a*), although the approved ES/EAD path list includes the "PE3" device (e.g., because "Route Type 1" advertisement for "PE3" was received), the aliasing path_list (e.g., 840) does not include the "PE3" device (e.g., because "Route Type 2" advertisement for the "PE3" device was not received). And, thus, the reachability summary for Ethernet Segment "ESI_B" and EVPN instance "EVI_B" 822 does not include the "PE3" device. Here, upon receipt of the "Route Type 2" EVPN advertisement (e.g., 847) that includes reachability information "PE3+L3" 850, the MAC path_list 806*c* is also updated with "MAC3" information 852. In addition, information from each of the "Route Type 2" EVPN advertisement is joined (e.g., via a logical "OR" operation), upon receipt of the EVPN advertisements, to implicitly generate the aliasing path_list 816*c* that includes both "PE2+L2" 854 and "PE3+L3" 856.

In addition, the "PE3" device is confirmed to be added as a BGP next hop as part of the "ESI next hop approval list" (e.g., in field 814*c*), and MAC Path_list resolution operation is performed—by looping thru MACs associated for a given ESI (or a specific MAC) and, for each single path list nexthop which are part of the approved ES/EAD path_list (also referred to as a "next hop approval list"), using the MAC for reachability for that ESI (or that specific MAC). As shown here, the reachability summary 818*c* is updated to additionally include "PE3+L3" 858 (in addition to the "PE2+L2" 834). The reachability information per EVI/ESI is then saved into the reachability summary (e.g., via a logical "OR"), and the FIB table is setup, per MAC, using the reachability summary. To this end, upon an ECMP packet being received at the instant edge device per Ethernet Segment "ESI_B" or EVPN instance "EVI_B" 848, the received ECMP packet is transmitted, via all-redundancy mode, through both "MAC2" 836 and "MAC3" 852 per reachability summary "PE2+L2" 834 and "PE3+L3" 858. Upon receipt (e.g., at the device 120, 122) of an EVI/EAD path list (e.g., associated with an explicit aliasing operation), the reachability summary field 818 is updated per EVI/EAD path list and the implicit aliasing path_list field 816 is ignored (or deemed as a "Don't Care").

In addition, upon receipt (e.g., at the device 120, 122) of a ES/EAD withdraw per a given Ethernet Segment (ESI) or EVPN instance (EVI), that Ethernet Segment (ESI) or EVPN instance (EVI) is removed from the second database 808. For example, upon receipt of a ES/EAD withdraw per Ethernet Segment "ESI_B" or EVPN instance "EVI_B" 848, the entries for 848, the corresponding ES/EAD path_list field entries 860, the corresponding aliasing path_list entries (e.g., 854, 856), and the corresponding reachability summary information (e.g., 834 and 858) is removed.

Although example embodiments of the present invention have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. For example, the embodiments have been shown and described herein with relation to specific protocols and terminology. However, the embodiments in their broader sense are not as limited, and may, in fact, be used with other suitably similar protocols, and may be described using functionally similar terms.

What is claimed is:

1. An apparatus comprising:
   one or more network ports;
   a processor operatively coupled to the one or more network ports; and
   a memory having instructions stored, thereon, wherein the instructions, when executed by the processor, cause the processor to:
   receive a first EVPN advertisement associated with either a first EVI (EVPN instance) or a first ESI (Ethernet Segment Identifier) from a first network device, wherein the first EVPN advertisement comprises reachability information associated with the first EVI or the first ESI for the first network device;
   store, in a routing table of the apparatus, the first EVI or first ESI in association with the reachability information associated with the first EVI or the first ESI for the first network device;
   receive a second EVPN advertisement associated with either the first EVI or the first ESI from a second network device, wherein the second EVPN advertisement comprises reachability information associated with the first EVI or the first ESI for the second network device;
   determine the first EVI or the first ESI exists in the routing table;
   implicitly join, via a union operation, in the routing table, the reachability information associated with the first EVI or the first ESI for the first network device and the second network device based on the determination, wherein the implicit joining is performed without a per-EVI EAD route associated with the first ESI or first EVI being received in an EVPN advertisement; and
   route traffic associated with the first EVI or the first ESI, and received at the one or more network ports, to both the first network device and the second network device based on the implicit joining.

2. The apparatus of claim 1, wherein the union operation to implicitly join the reachability information associated with the first network device and the second network device comprises:
   correlating, at the apparatus, network identifiers that are defined in a MPLS label of a received EVPN traffic received from two or more multi-homed devices, the received EVPN traffic comprising the first EVPN advertisement and the second EVPN advertisement; and
   associating, at the apparatus, the correlated network identifier to the first EVI or the first ESI.

3. The apparatus of claim 1, wherein at least one of the first EVPN advertisement and the second EVPN advertisement comprises a per MAC-VRF label assignment.

4. The apparatus of claim 1, wherein at least of the first EVPN advertisement and the second EVPN advertisement comprises a per <MAC-VRF, Ethernet Tag> label assignment.

5. The apparatus of claim 1, wherein at least one of the first EVPN advertisement and the second EVPN advertisement comprises a per <ESI, Ethernet tag> label assignment.

6. The apparatus of claim 1, wherein the first EVPN advertisement comprises a first type of EVPN label assignment, and wherein the second EVPN advertisement comprises a second type of EVPN label assignment, the first type of EVPN label assignment being different from the second type of EVPN assignment.

7. The apparatus of claim 1, wherein the first EVPN advertisement comprises a first type of EVPN label assignment, and wherein the second EVPN advertisement comprises a second type of EVPN label assignment, the first type of EVPN label assignment being the same as the second type of EVPN assignment.

8. The apparatus of claim 1, wherein the union operation applies to all MACs reachability information for first ESI or first EVI.

9. The apparatus of claim 1, wherein the instructions, when executed by the processor, cause the processor to:
   in response to receiving the first EVPN advertisement with the first EVI (EVPN instance) or the first ESI (Ethernet Segment Identifier) from the first network device, establish, via the one or more network ports, an EVPN interface with the first network device.

10. The apparatus of claim 1, wherein the apparatus is selected from the group consisting of an aggregation service router, switch, and a host.

11. The apparatus of claim 1, wherein the instructions, when executed by the processor, further cause the processor to:
    receive a third EVPN advertisement associated with an Ethernet AD per EVI route, wherein the Ethernet AD per EVI route comprises reachability information that includes two or more network identifiers associated with, at least, a third network device and a fourth network device;
    establish an association between the two or more network identifiers and the Ethernet AD per EVI route;
    transmit traffic in association with the Ethernet AD per EVI route to both the third network device and the fourth network device based on the received Ethernet AD per EVI route.

12. The apparatus of claim 1, wherein the instructions, when executed by the processor, further cause the processor to:
    receive a fourth EVPN advertisement associated with either a second EVI (EVPN instance) or a second ESI (Ethernet Segment Identifier) from a fifth network device, wherein the fourth EVPN advertisement comprises reachability information associated with the second EVI or the second ESI for the fifth network device, and wherein the fourth EVPN advertisement does not include a per-EVI EAD route associated with the first ESI or first EVI;
    receive a fifth EVPN advertisement associated with either the second EVI (EVPN instance) or the second ESI (Ethernet Segment Identifier) from a sixth network device, wherein the fifth EVPN advertisement comprises reachability information associated with the second EVI or the second ESI for the sixth network device, and wherein the fifth EVPN advertisement does not include a per-EVI EAD route associated with the first ESI or first EVI,
    join the reachability information associated with the fifth network device and the sixth network device;

route traffic associated with the second EVI or the second ESI to both the fifth network device and the sixth network device based on the implicit joining.

13. A method comprising:
receiving, at a network device, a first EVPN advertisement associated with either a first EVI (EVPN instance) or a first ESI (Ethernet Segment Identifier) from a first network device, wherein the first EVPN advertisement comprises reachability information associated with the first EVI or the first ESI for the first network device, wherein the first EVPN advertisement does not include a per-EVI EAD route associated with the first ESI or first EVI;
storing, in a routing table of the network device, the first EVI or first ESI in association with the reachability information associated with the first EVI or the first ESI for the first network device;
receiving, at the network device, a second EVPN advertisement associated with either the first EVI or the first ESI from a second network device, wherein the second EVPN advertisement comprises reachability information associated with the first EVI or the first ESI for the second network device, and wherein the second EVPN advertisement does not include a per-EVI EAD route associated with the first ESI or first EVI;
determining, at the network device, the first EVI or the first ESI exists in the routing table;
implicitly joining, in the routing table, via a union operation, the reachability information associated with the first network device and the second network device based on the determination, wherein the implicit joining is performed without a per-EVI EAD route associated with the first ESI or first EVI being received in an EVPN advertisement;
routing, from the network device, traffic associated with the first EVI or the first ESI to both the first network device and the second network device based on the implicit joining.

14. The method of claim 13, comprising:
receiving, at the network device, a third EVPN advertisement associated with an Ethernet AD per EVI route, wherein the Ethernet AD per EVI route comprises reachability information includes two or more network identifiers associated with corresponding two or more network identifiers associated with, at least, a third network and a fourth network device;
establishing an association between the two or more network identifiers and the Ethernet AD per EVI route;
routing traffic associated with the Ethernet AD per EVI route to both the third network device and the fourth network device based on the received Ethernet AD per EVI route.

15. The method of claim 13, wherein at least one of the first EVPN advertisement and the second EVPN advertisement comprises an EVPN label selected from the group consisting of a per MAC-VRF label assignment, a per <MAC-VRF, Ethernet Tag> label assignment, and a per <ESI, Ethernet tag> label assignment.

16. The method of claim 13, wherein the first EVPN advertisement comprises a first type of EVPN label assignment, and wherein the second EVPN advertisement comprises a second type of EVPN label assignment, the first type of EVPN label assignment being different from the second type of EVPN assignment.

17. The method of claim 13, wherein the first EVPN advertisement comprises a first type of EVPN label assignment, and wherein the second EVPN advertisement comprises a second type of EVPN label assignment, the first type of EVPN label assignment being the same as the second type of EVPN assignment.

18. The method of claim 13, wherein the union operation applies to all MACs reachability information for first EVI or first ESI.

19. The method of claim 13, comprising:
in response to receiving the first EVPN advertisement with the first EVI (EVPN instance) or the first ESI (Ethernet Segment Identifier) from the first network device, establishing, via the one or more network ports, an EVPN interface with the first network device.

20. A non-transitory computer-readable medium having instructions stored thereon, wherein execution of the instructions by a processor, cause the processor to:
receive a first EVPN advertisement associated with either a first EVI (EVPN instance) or a first ESI (Ethernet Segment Identifier) from a first network device, wherein the first EVPN advertisement comprises reachability information associated with the first EVI or the first ESI for the first network device, and wherein the first EVPN advertisement does not include a per-EVI EAD route associated with the first ESI or first EVI;
store, in a routing table, the first EVI or first ESI in association with the reachability information associated with the first EVI or the first ESI for the first network device;
receive a second EVPN advertisement associated with either the first EVI (EVPN instance) or the first ESI (Ethernet Segment Identifier) from a second network device, wherein the second EVPN advertisement comprises reachability information associated with the first EVI or the first ESI for the second network device, and wherein the second EVPN advertisement does not include a per-EVI EAD route associated with the first ESI or first EVI;
implicitly join, in the routing table, via a union operation, the reachability information associated with the first network device and the second network device based on the determination, wherein the implicit joining is performed without a per-EVI EAD route associated with the first ESI or first EVI being received in an EVPN advertisement; and
route traffic associated with the first EVI or the first ESI to both the first network device and the second network device based on the implicit joining.

* * * * *